US009042091B2

(12) United States Patent
Hsu et al.

(10) Patent No.: US 9,042,091 B2
(45) Date of Patent: May 26, 2015

(54) PORTABLE ELECTRONIC DEVICE WITH HINGE STRUCTURE

(71) Applicant: Wistron Corporation, New Taipei (TW)

(72) Inventors: Wen-Chi Hsu, New Taipei (TW);
Cheng-Hsing Liu, New Taipei (TW);
Chu-Chia Tsai, New Taipei (TW);
Chin-Ming Wei, New Taipei (TW);
San-Pao Kao, New Taipei (TW);
Cheng-Hsiang Chuang, New Taipei
(TW); Hung-Chih Chen, New Taipei
(TW); Shun-De Bai, New Taipei (TW)

(73) Assignee: Winstron Corporation, Hsichih, New Taipei (TW)

( * ) Notice: Subject to any disclaimer, the term of this patent is extended or adjusted under 35 U.S.C. 154(b) by 121 days.

(21) Appl. No.: 13/975,381

(22) Filed: Aug. 26, 2013

(65) Prior Publication Data
US 2014/0126134 A1 May 8, 2014

(30) Foreign Application Priority Data

Nov. 7, 2012 (TW) .............................. 101141307 A

(51) Int. Cl.
G06F 1/16 (2006.01)
(52) U.S. Cl.
CPC .............. G06F 1/1616 (2013.01); G06F 1/162 (2013.01); G06F 1/1681 (2013.01)
(58) Field of Classification Search
CPC ....................................................... G06F 1/162
USPC ..................................................... 361/679.27
See application file for complete search history.

(56) References Cited

U.S. PATENT DOCUMENTS

| 6,385,039 | B1 | 5/2002 | Chiang et al. | |
|---|---|---|---|---|
| 7,113,397 | B2 | 9/2006 | Lee | |
| 2010/0263166 | A1* | 10/2010 | Wang et al. | 16/297 |
| 2014/0055923 | A1* | 2/2014 | Mori et al. | 361/679.01 |

FOREIGN PATENT DOCUMENTS

| TW | 510513 | 11/2002 |
|---|---|---|
| TW | M352875 | 3/2009 |

OTHER PUBLICATIONS

Office action mailed on Aug. 4, 2014 for the Taiwan application No. 101141307, filed: Nov. 7, 2012, p. 1 line 12~14, p. 2 line 1~16.

* cited by examiner

Primary Examiner — Anthony Q Edwards
(74) Attorney, Agent, or Firm — Winston Hsu; Scott Margo

(57) ABSTRACT portable electronic device includes a host module, a display module and a hinge structure. The hinge structure is pivotally connected to the host module and the display module. The hinge structure includes a support frame, a rotating component and two pivotal components. An end of the rotating component is installed inside the support frame and another end of the rotating component is installed inside the display module, so that the display module is capable of rotating in a first rotating direction relative to the support frame. The two pivotal components are disposed at opposite sides of the support frame and separated from the rotating component. An end of each pivotal component is installed inside the support frame and another end of each pivotal component is installed inside the host module, so that the display module is capable of rotating in a second rotating direction relative to the host module.

20 Claims, 15 Drawing Sheets

PORTABLE ELECTRONIC DEVICE WITH HINGE STRUCTURE

BACKGROUND OF THE INVENTION

1. Field of the Invention

The invention relates to a portable electronic device and, more particularly, to a portable electronic device with a rotatable hinge structure.

2. Description of the Prior Art

So far a transformable notebook has been developed and can be used as a conventional notebook or a flat computer, such that a user can use the transformable notebook in a suitable state according to different conditions. However, compared with the conventional notebook, since a hinge structure of the transformable notebook is installed at a central portion of a display module and the size of a rotating base of the hinge structure is large, the size and weight of the transformable notebook is larger and heavier than the conventional notebook. Furthermore, since the hinge structure is installed at the central portion of the display module and is the only pivot relative to a host module, the display module is easy to shake to make the user feel uncomfortable while the user uses the transformable notebook as a conventional notebook and performs touch operation on the display module. Accordingly, how to design a hinge structure with small size, rotatable capability and good stability for touch operation performed on the display module is a significant issue for mechanical design.

SUMMARY OF THE INVENTION

The invention provides a hinge structure with small size and good stability for touch operation performed on the display module, so as to solve the aforesaid problems.

According to the claimed invention, a portable electronic device comprises a host module, a display module and a hinge structure. The hinge structure is pivotally connected to the host module and the display module. The hinge structure comprises a support frame, a rotating component and two pivotal components. An end of the rotating component is installed inside the support frame and another end of the rotating component is installed inside the display module, so that the display module is capable of rotating in a first rotating direction relative to the support frame. The two pivotal components are disposed at opposite sides of the support frame and separated from the rotating component. An end of each pivotal component is installed inside the support frame and another end of each pivotal component is installed inside the host module, so that the display module is capable of rotating in a second rotating direction relative to the host module, wherein the second rotating direction is different from the first rotating direction.

According to the claimed invention, the support frame is used for supporting the host module while the display module rotates to open in the second rotating direction relative to the host module.

According to the claimed invention, the support frame comprises a support portion, a first connecting portion and a second connecting portion. The first connecting portion is connected to the and used for connecting the rotating component. The second connecting portion is connected to the first connecting portion and used for connecting the two pivotal components.

According to the claimed invention, an indentation is formed on the host module and used for accommodating the second connecting portion, a length of the second connecting portion is substantially equal to a length of the indentation.

According to the claimed invention, a length of the second connecting portion is shorter than a length of the first connecting portion, an accommodating space is formed between the second connecting portion and the first connecting portion and used for accommodating the two pivotal components.

According to the claimed invention, the support portion is column-shaped, and a sum of a thickness of the display module close to the first connecting portion and a thickness of the host module close to the second connecting portion is substantially equal to a diameter of the support portion.

According to the claimed invention, the rotating component is disposed at a central position of the first connecting portion and the two pivotal components are disposed at opposite sides of the second connecting portion.

According to the claimed invention, the portable electronic device further comprises a battery accommodated in the support portion of the support frame.

According to the claimed invention, the battery is a column-shaped battery and the support portion is column-shaped.

According to the claimed invention, the portable electronic device further comprises at least one skidproof component disposed outside the support frame.

According to the claimed invention, at least parts of an outer surface of the support frame are arc-shaped in radial direction relative to the support frame.

According to the claimed invention, a hole is formed at a side of the display module, and the rotating component comprises a decorative portion disposed in the hole while the another end of the rotating component is installed inside the display module.

According to the claimed invention, a recess is formed on the host module, corresponding to the hole of the display module, and used for accommodating the decorative portion of the rotating component while the display module is closed on the host module.

According to the claimed invention, the support frame is an elongated frame used for supporting the host module while the display module rotates to open in the second rotating direction relative to the host module.

According to the claimed invention, the portable electronic device further comprises at least one skidproof component disposed outside the support frame.

According to the claimed invention, the display module is a touch display module.

According to the claimed invention, the first rotating direction is substantially perpendicular to the second rotating direction.

According to the claimed invention, the rotating component comprises a first rotating portion and a second rotating portion. The first rotating portion is installed inside the display module. An engaging groove is formed on the first rotating portion. The second rotating portion is installed inside the support frame. A restraining block is formed on the second rotating portion and corresponding to the engaging groove. The restraining block is engaged in the engaging groove so as to restrain the first rotating portion from rotating relative to the second rotating portion. The first rotating portion is capable of rotating in the first rotating direction relative to the second rotating portion while the first rotating portion moves in a first direction relative to the second rotating portion such that the engaging groove is disengaged from the restraining block.

According to the claimed invention, the rotating component further comprises an axle and at least one restraining component. The axle is installed inside the first rotating portion and the second rotating portion. The axle is capable of moving together with the first rotating portion and moving relative to the second rotating portion. At least one protruding block is formed on the axle. The at least one restraining component is installed inside the second rotating portion. The at least one restraining component is used for abutting against the at least one protruding block while the first rotating portion moves in the first direction relative to the second rotating portion, so as to prevent the axle from coming off the second rotating portion.

According to the claimed invention, the rotating component further comprises a sleeve disposed between the first rotating portion and the axle in a tight-fitting manner such that the axle is capable of moving together with the first rotating portion.

Compared with the prior art, the rotatable hinge structure of the portable electronic device of the invention comprises a support frame, a rotating component and two pivotal components. Since the frame, the rotating component and the two pivotal components are separated from each other, the portable electronic device of the invention can be used as a conventional notebook or a flat computer, the size of the hinge structure is reduced greatly, and the stability for touch operation performed on the display module relative to the host module is enhanced. Accordingly, the problems mentioned in the prior art can be improved by the invention.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
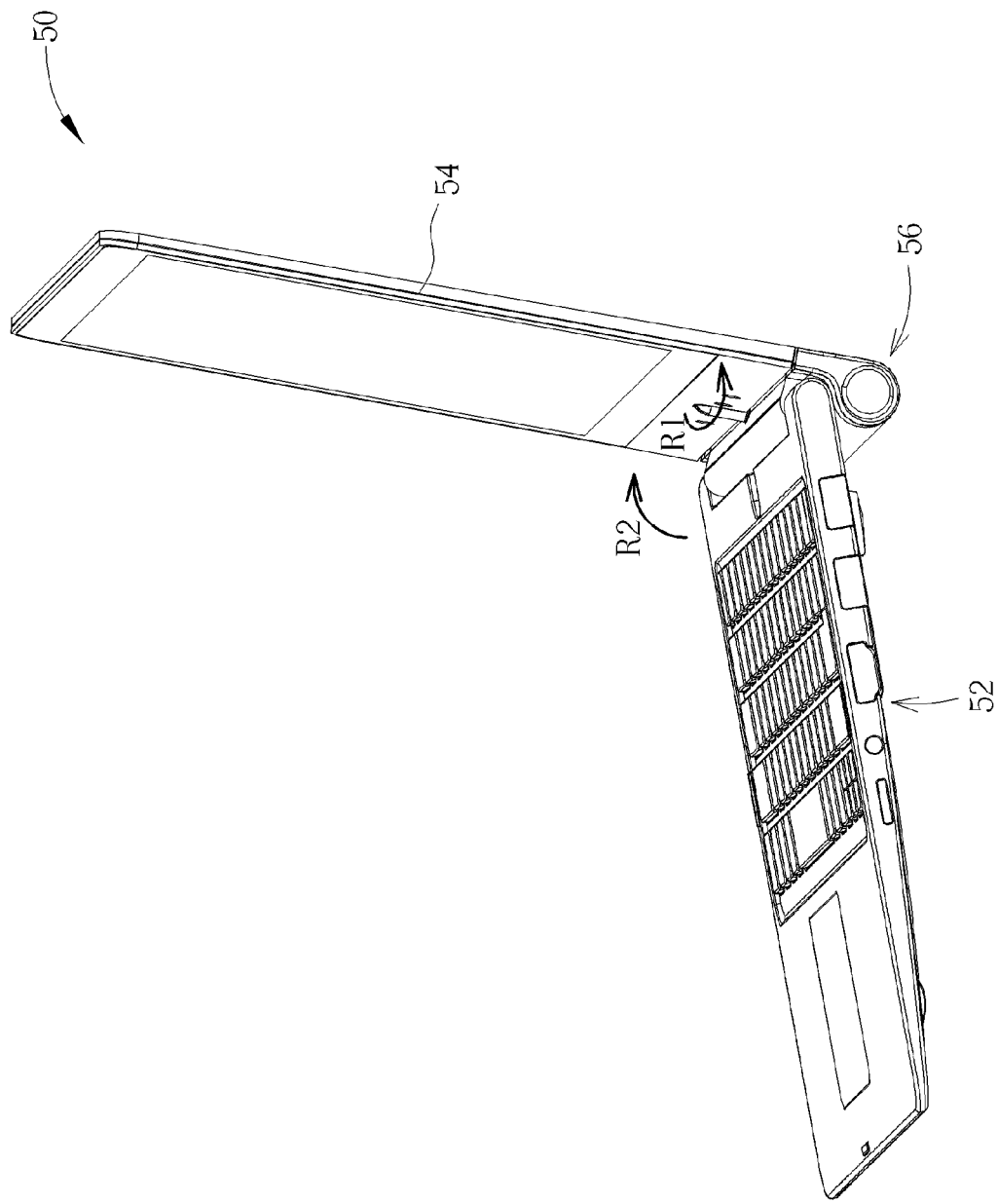
FIG. 1 is a perspective view illustrating a portable electronic device according to an embodiment of the invention.
Figure 2:
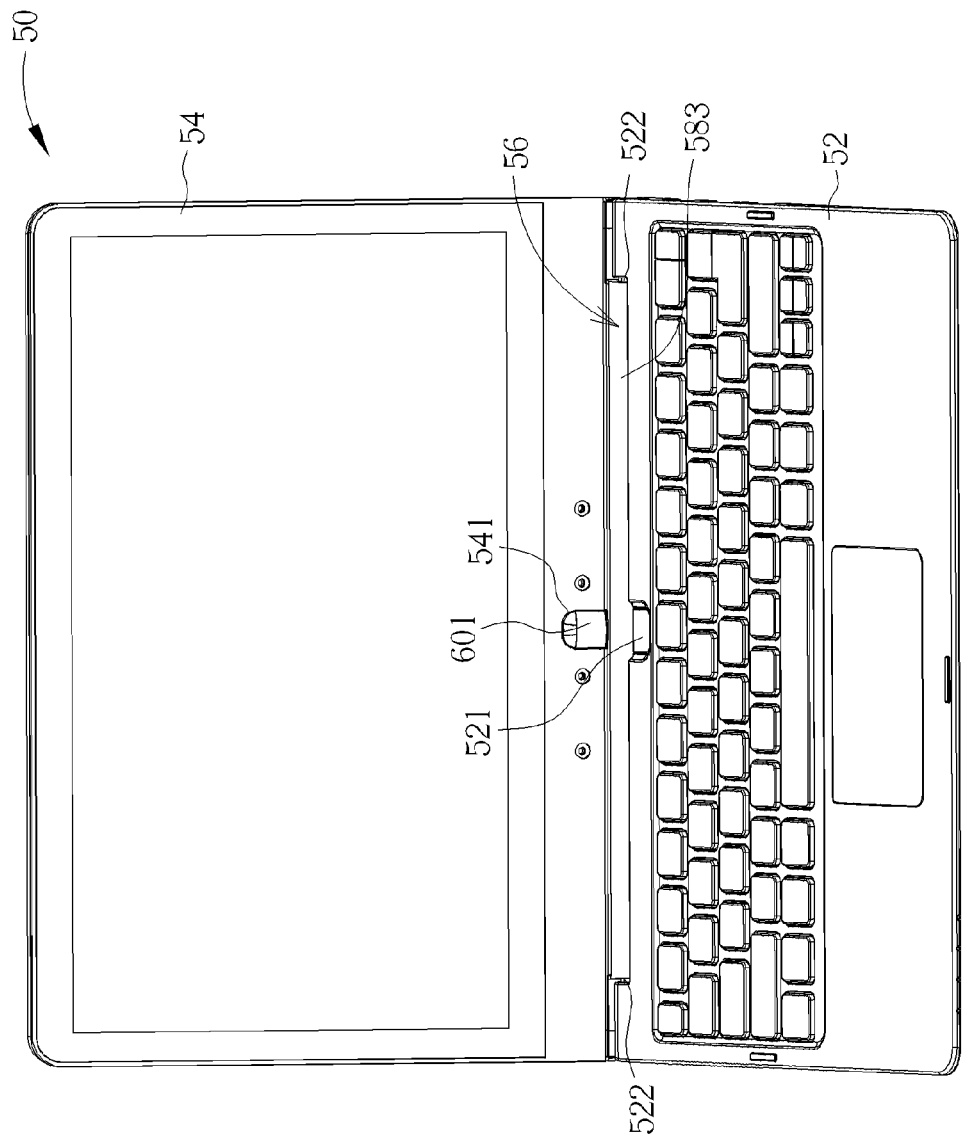
FIG. 2 is a perspective view illustrating the portable electronic device from another viewing angle according to the embodiment of the invention.

Referring to FIGS. 1 and 2, FIG. 1 is a perspective view illustrating a portable electronic device 50 according to an embodiment of the invention, and FIG. 2 is a perspective view illustrating the portable electronic device 50 from another viewing angle according to the embodiment of the invention. The portable electronic device 50 of the invention comprises a host module 52, a display module 54 and a hinge structure 56. The portable electronic device 50 may be a commercial notebook or a military portable computer. The host module 52 comprises various electronic components for operation purpose for the portable electronic device 50, such as central processing unit (CPU), memory, hard disc, interface card, keyboard, connector, and so on. The display module 54 is pivotally connected to the host module 52. In this embodiment, the display module 54 is capable of rotating relative to the host module 52 through the hinge structure 56. The display module 54 may be a touch display module. In other words, a user can use a finger to touch the display module 54 immediately to input various desired commands.

Figure 3:
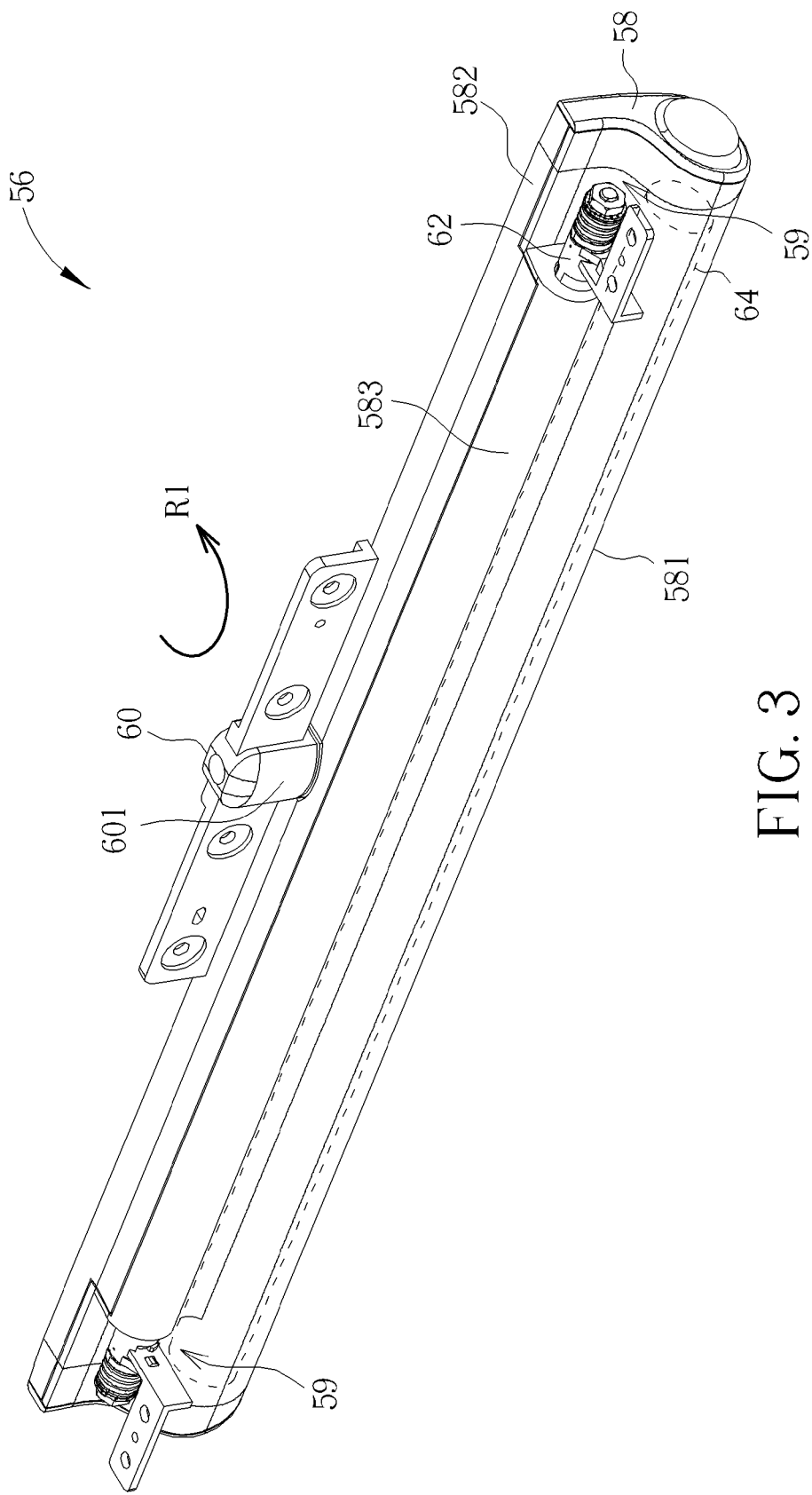
FIG. 3 is a perspective view illustrating the hinge structure according to the embodiment of the invention.
Figure 4:
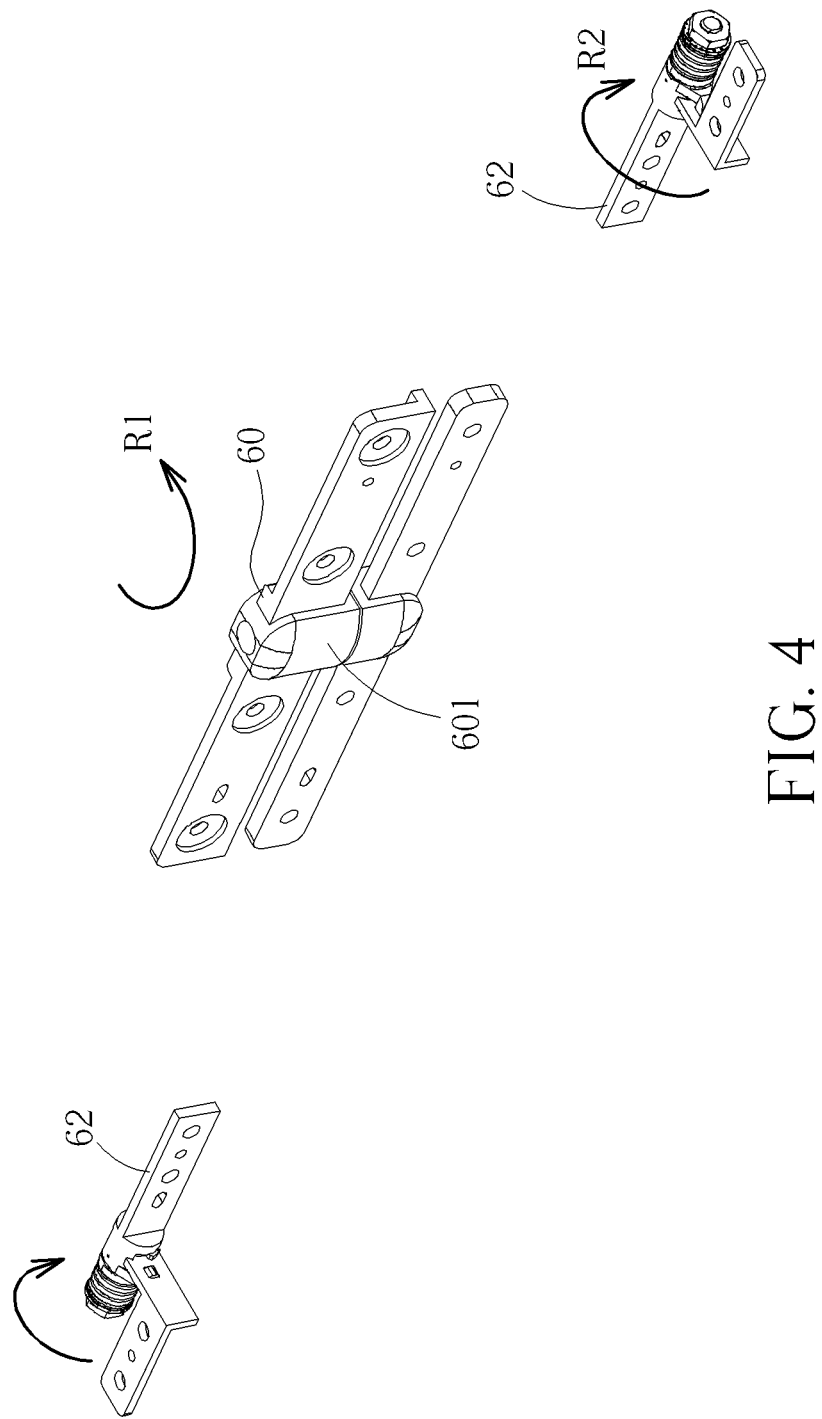
FIG. 4 is a perspective view illustrating parts of the hinge structure according to the embodiment of the invention.
Figure 5:
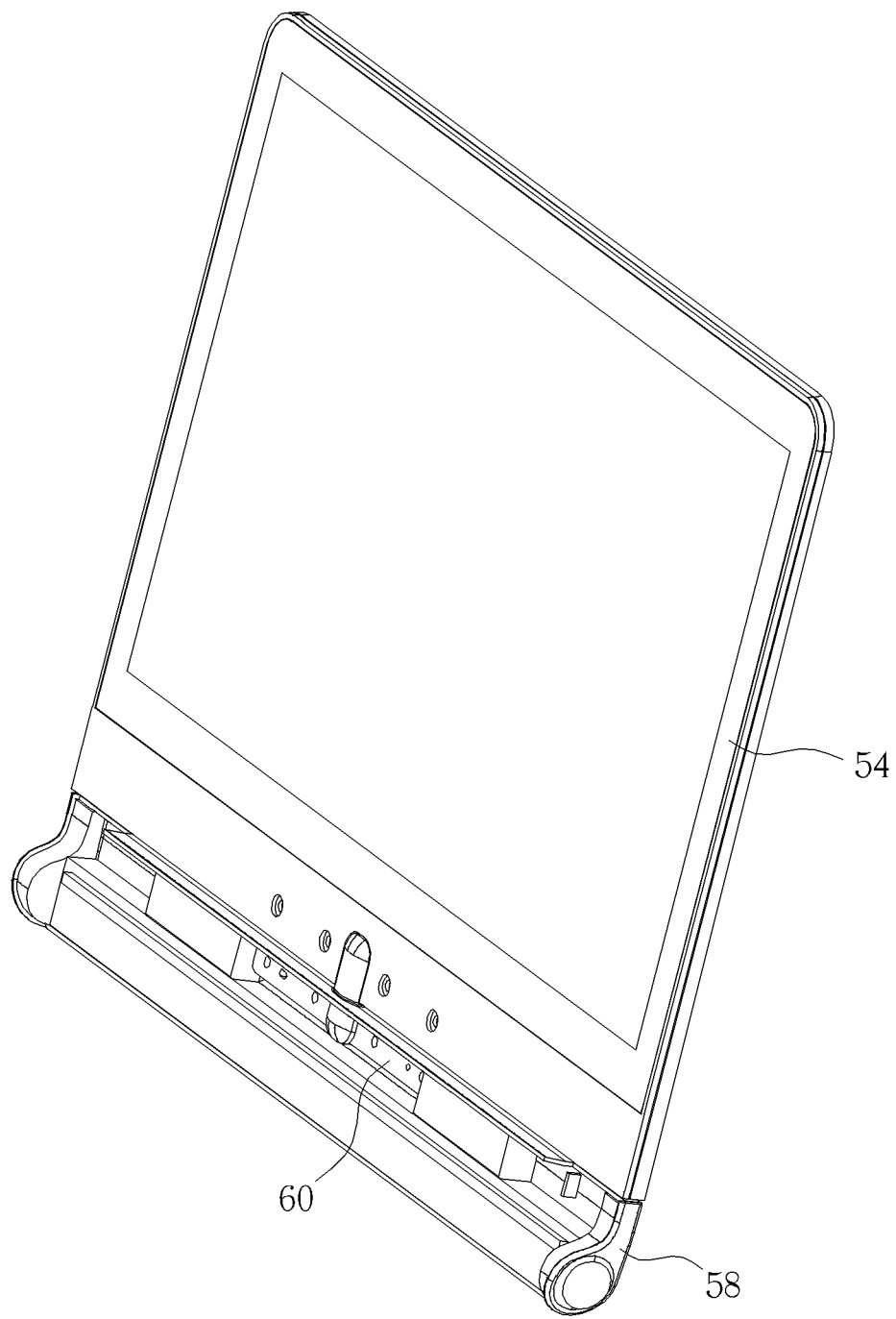
FIG. 5 is a perspective view illustrating parts of the portable electronic device according to the embodiment of the invention.

Referring to FIGS. 3 to 5, FIG. 3 is a perspective view illustrating the hinge structure 56 according to the embodiment of the invention, FIG. 4 is a perspective view illustrating parts of the hinge structure 56 according to the embodiment of the invention, and FIG. 5 is a perspective view illustrating parts of the portable electronic device 50 according to the embodiment of the invention. The hinge structure 56 comprises a support frame 58, a rotating component 60 and two pivotal components 62. In this embodiment, the support frame 58 comprises a support portion 581, a first connecting portion 582 and a second connecting portion 583, wherein the support portion 581 is column-shaped, the first connecting portion 582 is connected to the support portion 581 and used for connecting the rotating component 60, and the second connecting portion 583 is connected to the first connecting portion 582 and used for connecting the two pivotal components 62. At least parts of outer surfaces of the support portion 581 and the second connecting portion 583 are arc-shaped in radial direction relative to the support frame 58. The portable electronic device 50 further comprises a battery 64 accommodated in the support portion 581 of the support frame 58. In this embodiment, the battery may be, but not limited to, a column-shaped battery. An end of the rotating component 60 is installed inside a central position of the first connecting portion 582 of the support frame 58 and another end of the rotating component 60 is installed inside the display module 54, so that the display module 54 is capable of rotating in a first rotating direction R1 relative to the support frame 58. As shown in FIGS. 3 and 5, a lower end of the rotating component 60 is installed inside the support frame 58 and an upper end of the rotating component 60 is installed inside the display module 54. Furthermore, the upper end of the rotating component 60 is capable of rotating in the first rotating direction R1 relative to the lower end of the rotating component 60, such that the display module 54 is capable of rotating in the first rotating direction R1 relative to the support frame 58 through the rotating component 60. In this embodiment, through the mechanical design inside the rotating component 60, the display module 54 cannot rotate in the first rotating direction R1 anymore after rotating relative to the support frame 58 with 180 degrees. In other words, the maximum rotating angle of the display module 54 is, but not limited to, 180 degrees. Moreover, referring to FIG. 2 at the same time, the rotating component 60 comprises a decorative portion 601 at the front and a hole 541 is formed at a side of the display module 54. When an end of the rotating component 60 is installed inside the display module 54, the decorative portion 601 is disposed in the hole 541. Accordingly, the exposed portion of the rotating component 60 is pleasing to the eye and it is unnecessary to use any covers to cover the rotating component 60. Still further, a recess 521 is formed on the host module 52, corresponding to the hole 541 of the display module 54, and used for accommodating the decorative portion 601 of the rotating component 60 while the display module 54 is closed on the host module 52. As shown in FIG. 2, an indentation 522 is formed on the host module 52 and used for accommodating the second connecting portion 583, wherein a length of the second connecting portion 583 is substantially equal to a length of the indentation 522. Furthermore, referring to FIG. 3 at the same time, a length of the second connecting portion 583 is shorter than a length of the first connecting portion 582, such that an accommodating space 59 is formed between the second connecting portion 583 and the first connecting portion 582 and used for accommodating the two pivotal components 62.

As shown in FIG. 3, the two pivotal components 62 are disposed at opposite sides of the second connecting portion 583 of the support frame 58 and separated from the rotating component 60. In other words, each of the pivotal components 62 and the rotating component are separated from each other and there is no direct connection between them. An end of each pivotal component 62 is installed inside the second connecting portion 583 of the support frame 58 and another end of each pivotal component 62 is installed inside the host module 52 shown in FIG. 1. Accordingly, as shown in FIG. 1, the display module 54 is capable of rotating in a second rotating direction R2 relative to the host module 52, wherein the second rotating direction R2 is different from the first rotating direction R1. In other words, the display module 54 is capable of rotating in the second rotating direction R2 relative to the host module 52 from a closed state to an opened state for a user to perform operation. It should be noted that the first rotating direction R1 is substantially perpendicular to the second rotating direction R2.

Figure 6:
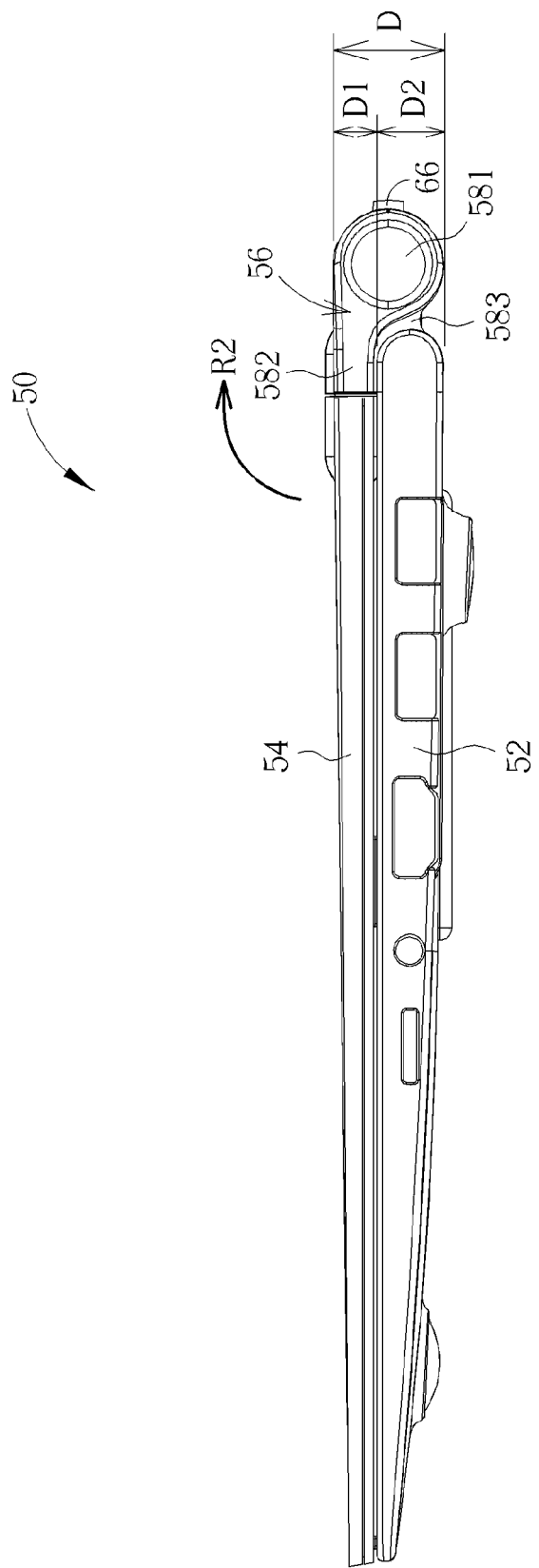
FIG. 6 is a side view illustrating the portable electronic device being closed according to the embodiment of the invention.
Figure 7:
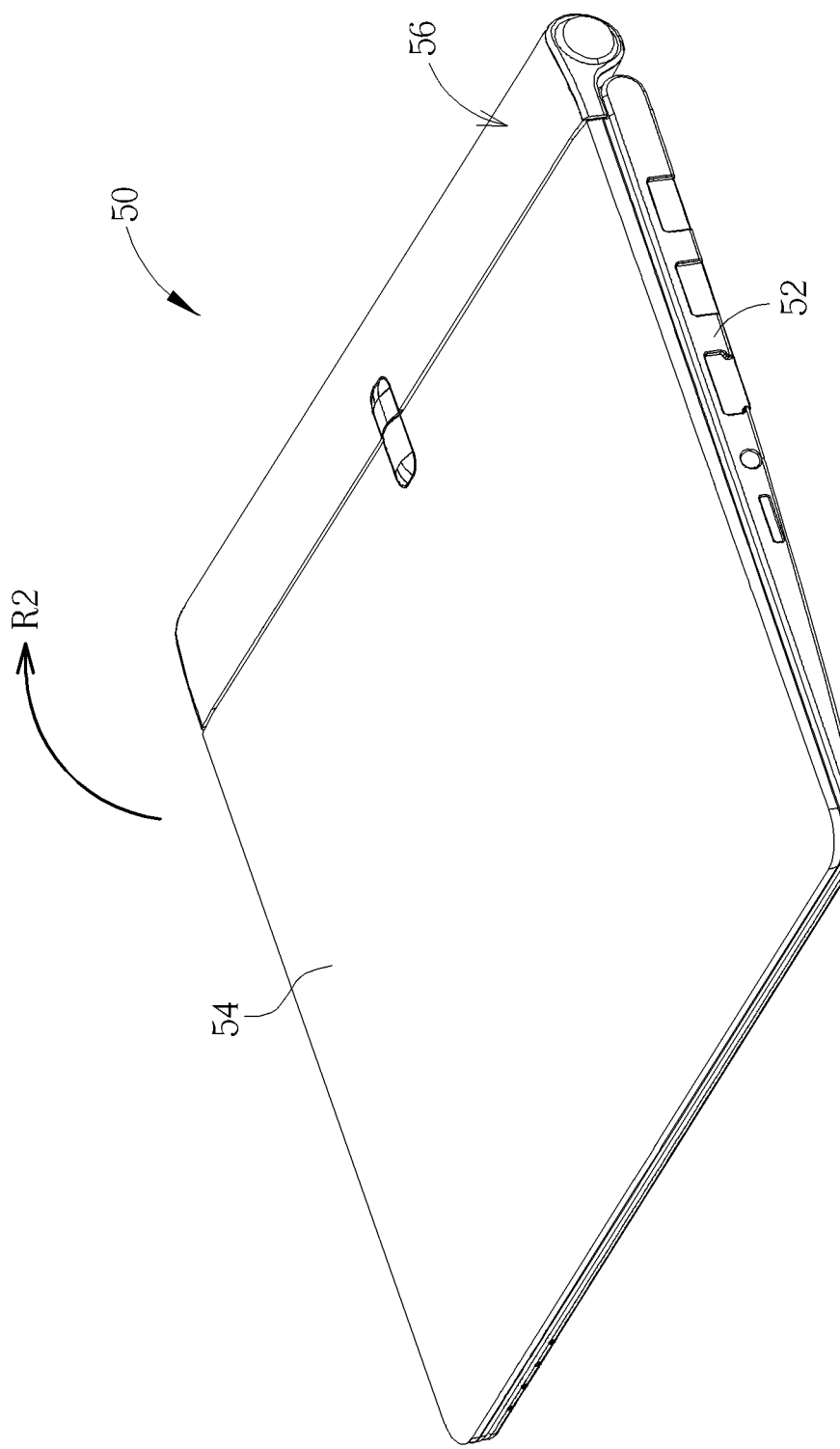
FIG. 7 is a perspective view illustrating the portable electronic device being closed according to the embodiment of the invention.
Figure 8:
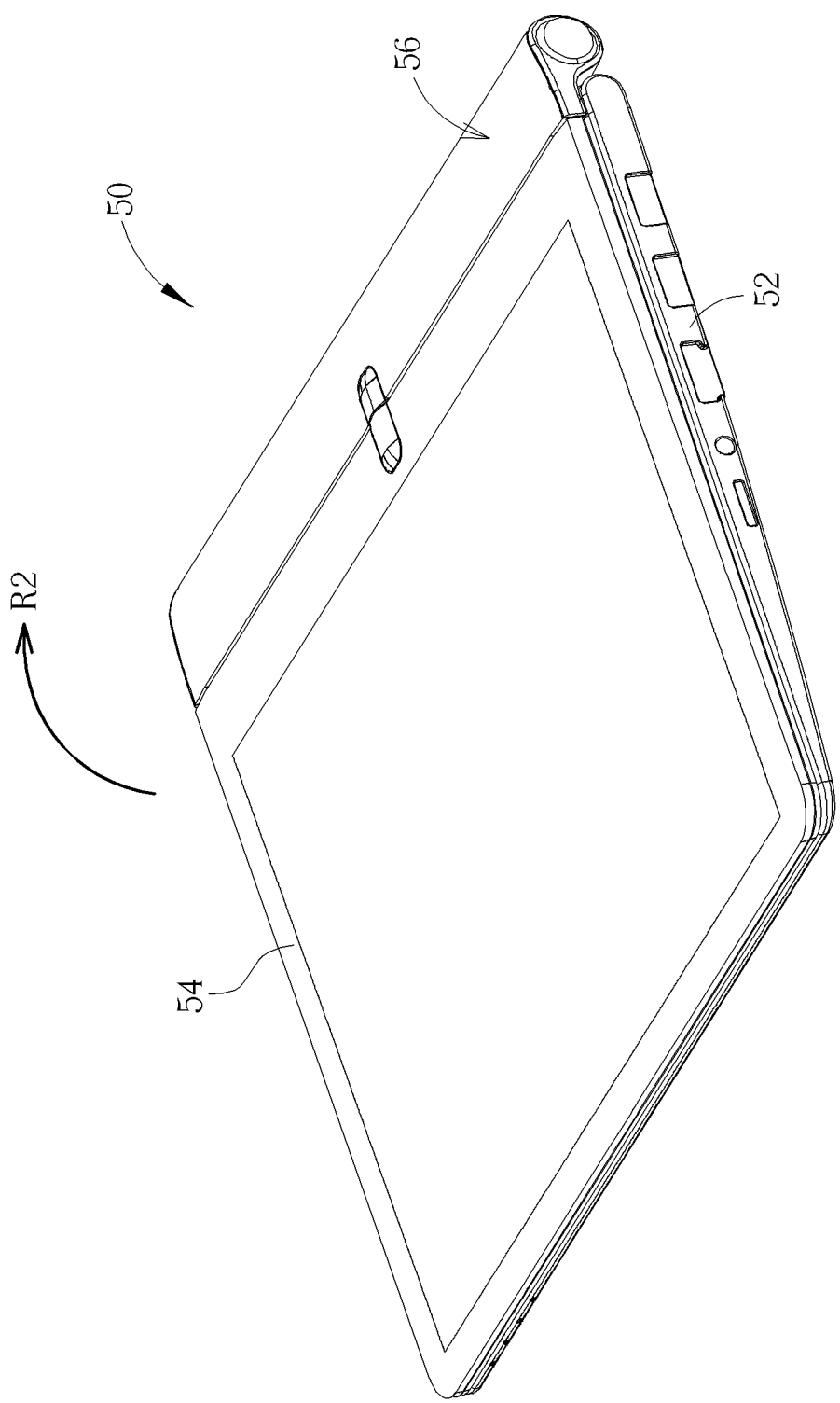
FIG. 8 is a perspective view illustrating the display module of the portable electronic device being rotated and then closed according to the embodiment of the invention.

The operation of the portable electronic device 50 of the invention will be described in the following. Referring to FIGS. 1 and 6-8, FIG. 6 is a side view illustrating the portable electronic device 50 being closed according to the embodiment of the invention. As shown in FIG. 6, a sum of a thickness D1 of the display module 54 close to the first connecting portion 582 and a thickness D2 of the host module 52 close to the second connecting portion 583 is substantially equal to a diameter D of the support portion 581. FIG. 7 is a perspective view illustrating the portable electronic device 50 being closed according to the embodiment of the invention. FIG. 8 is a perspective view illustrating the display module 54 of the portable electronic device 50 being rotated and then closed according to the embodiment of the invention. When a user wants to use the portable electronic device 50 of the invention, he/she can rotate the display module 54 of the portable electronic device 50 in the second rotating direction R2 relative to the host module 52 from the closed state in FIGS. 6 and 7 to the opened state in FIG. 1. At this time, the support frame 58 supports the host module 52. Afterward, the user may operate the host module 52 or perform touch operation on the display module 54 immediately to input desired operation commands. Since the support frame 58 and the two pivotal components 62 are connected to each other and the rotating component 60 cannot rotate in the second rotating direction R2, the support frame 58 can support the display module 54 well so that the display module 54 will not shake while the user perform touch operation thereon, so as to enhance the stability of the display module 54 relative to the host module 52. It should be noted that the portable electronic device 50 shown in FIG. 6 may further comprise at least one skidproof component 66 disposed outside the support frame 58. When the portable electronic device 50 is situated at the opened state in FIG. 1, the skidproof component 66 can be used for increasing friction between the support frame 58 and a plane where the portable electronic device 50 is placed on so that the portable electronic device 50 can be placed on any planes stably, such as tabletop or ground. It should be noted that whether to install the skidproof component 66 can be determined based on practical applications. Furthermore, when the user wants to use the portable electronic device 50 as a flat computer, he/she can rotate the display module 54 shown in FIG. 1 in the first rotating direction R1 with 180 degrees relative to the support frame 58 and then close the display module 54 on the host module 52 in a reverse direction of the second rotating direction R2. As shown in FIG. 8, the user can use the portable electronic device 50 as a flat computer consequently.

Figure 9:
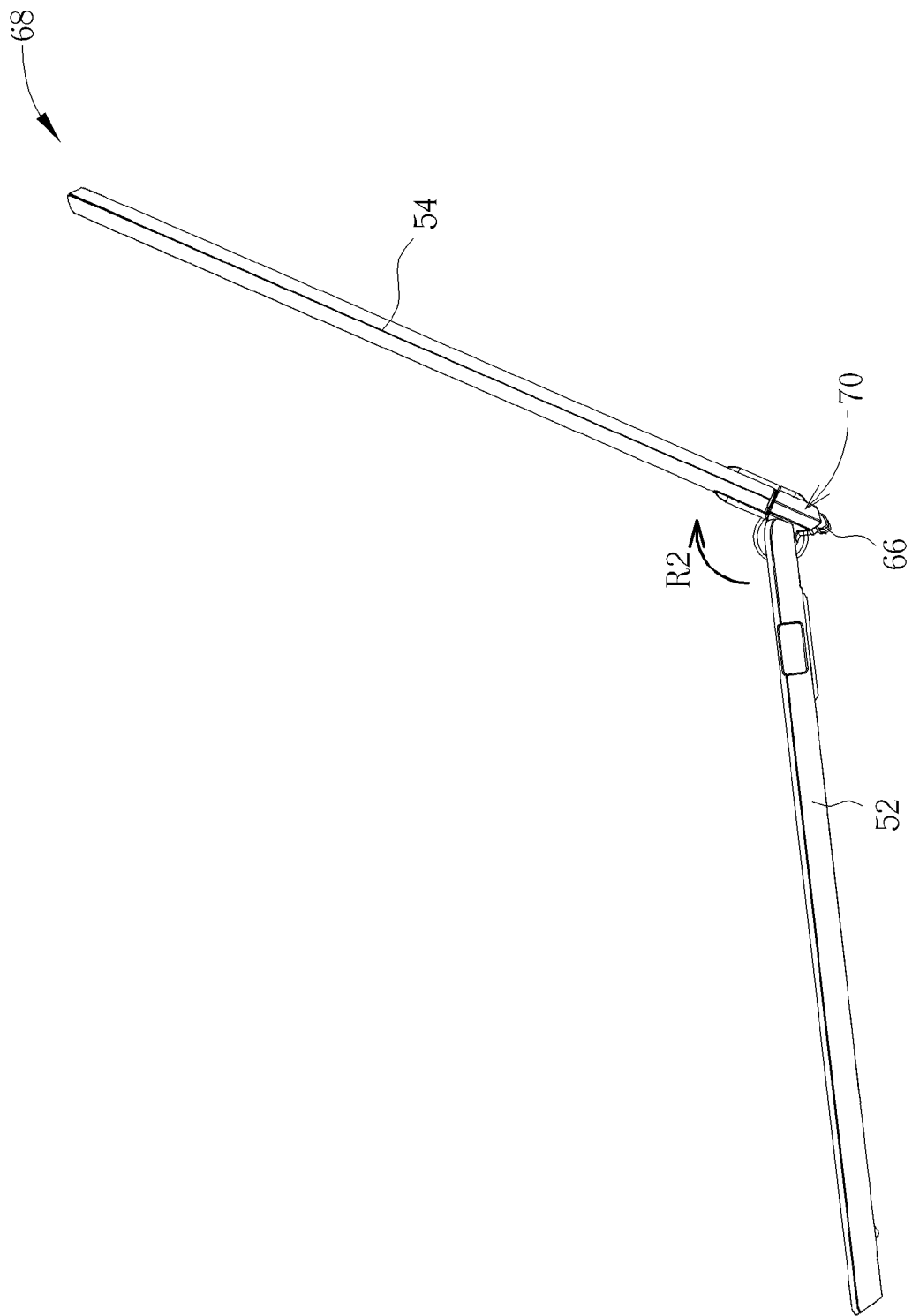
FIG. 9 is a side view illustrating a portable electronic device being opened according to another embodiment of the invention.
Figure 10:
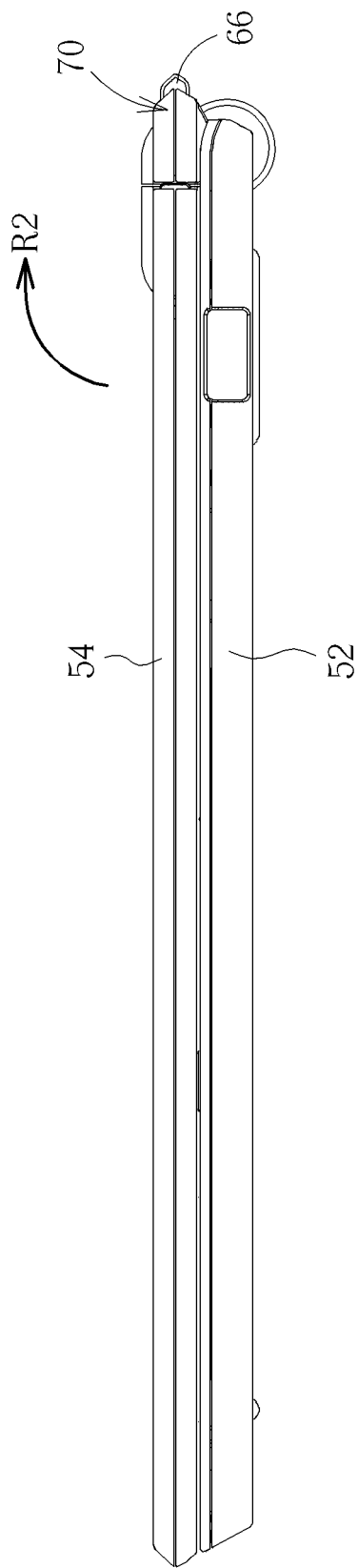
FIG. 10 is a side view illustrating the portable electronic device being closed according to another embodiment of the invention.
Figure 11:
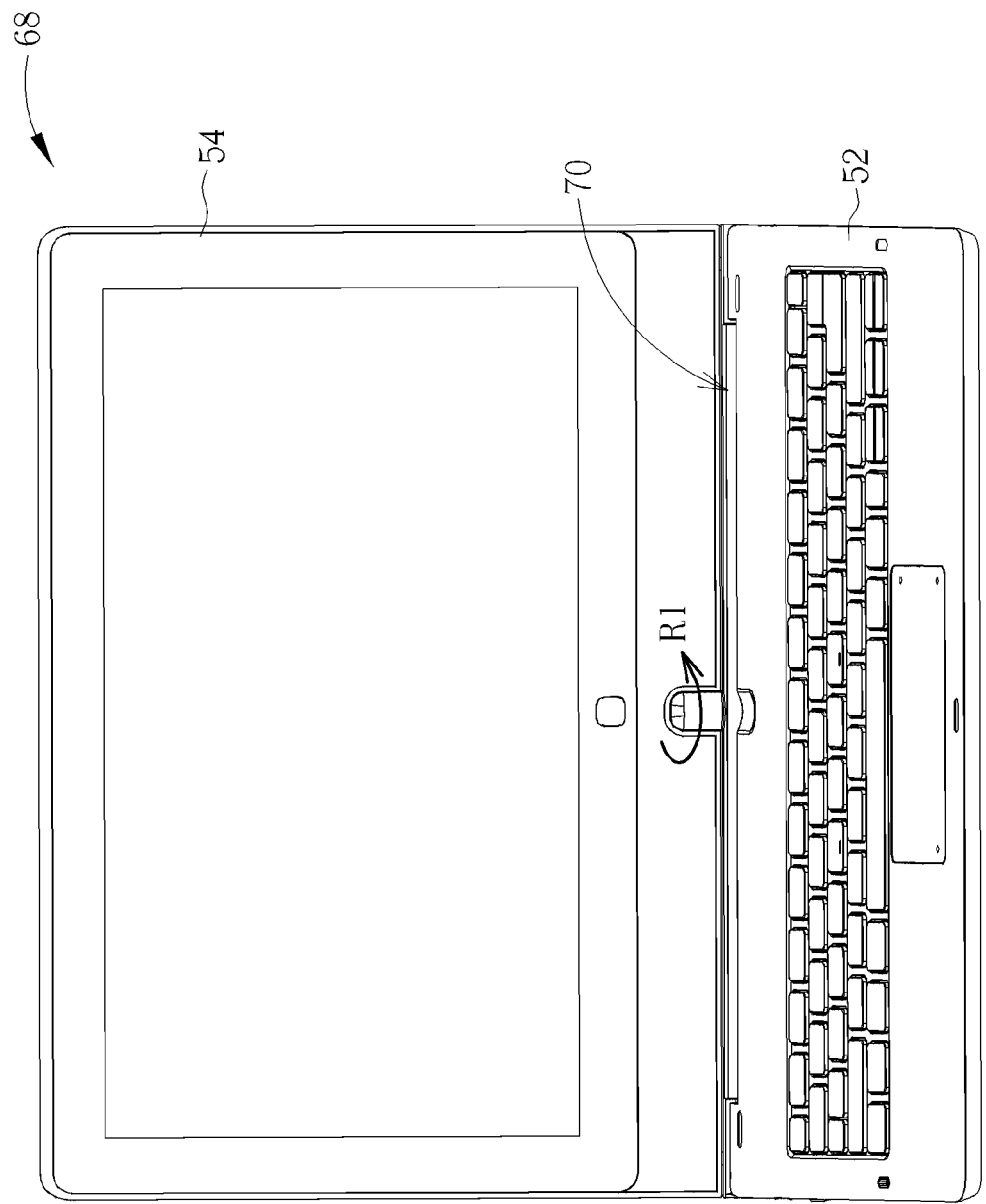
FIG. 11 is a perspective view illustrating the portable electronic device according to another embodiment of the invention.
Figure 12:
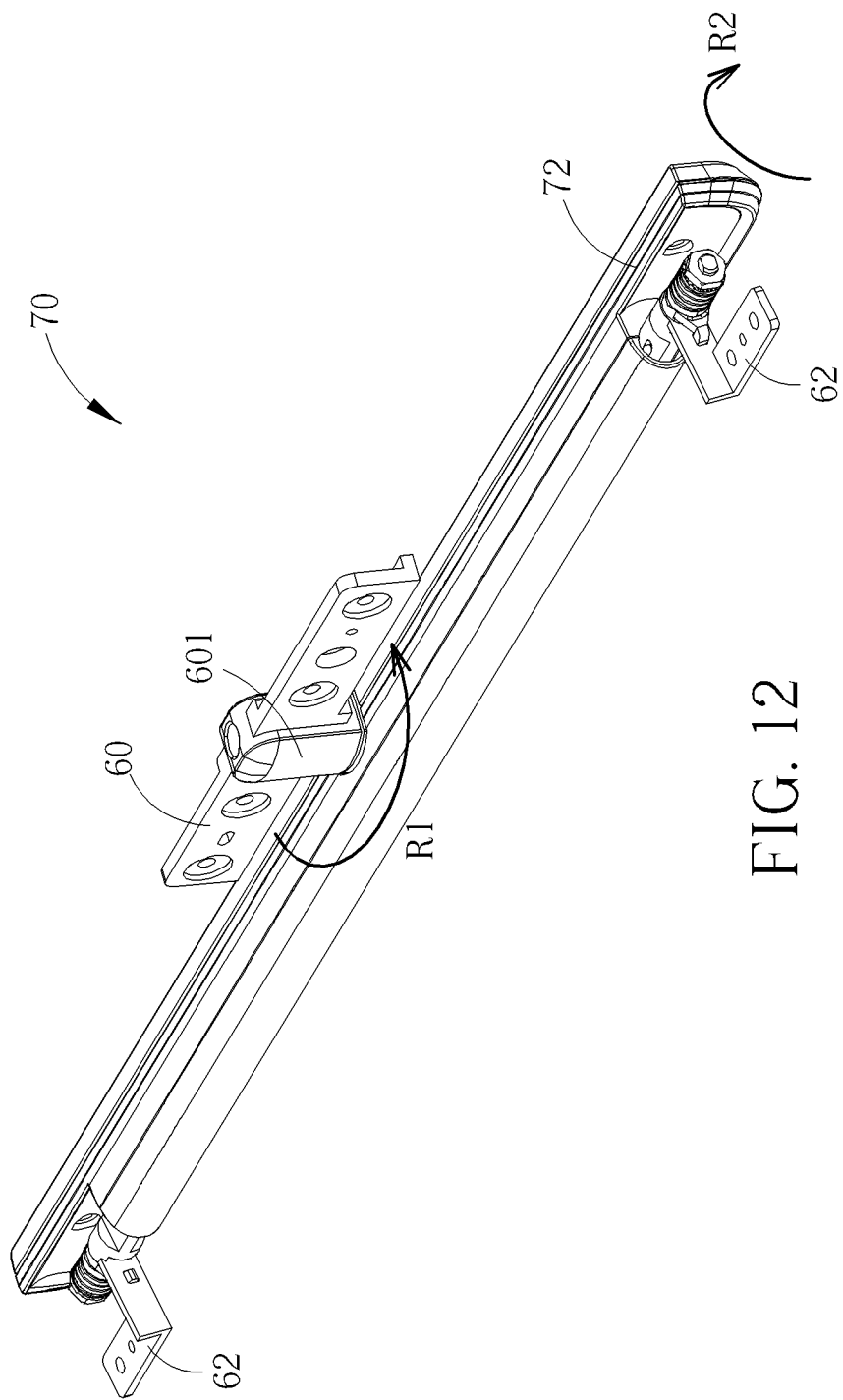
FIG. 12 is a perspective view illustrating a hinge structure according to another embodiment of the invention.

Referring to FIGS. 9 to 12, FIG. 9 is a side view illustrating a portable electronic device 68 being opened according to another embodiment of the invention, FIG. 10 is a side view illustrating the portable electronic device 68 being closed according to another embodiment of the invention, FIG. 11 is a perspective view illustrating the portable electronic device 68 according to another embodiment of the invention, and FIG. 12 is a perspective view illustrating a hinge structure 70 according to another embodiment of the invention. The difference between this embodiment and the aforesaid embodiment is that the support frame 72 of the hinge structure 70 is an elongated frame and the battery of the portable electronic device 68 is not installed inside the support frame 72. For example, the battery of the portable electronic device 68 may be installed inside the host module 52. Moreover, the same elements in this embodiment and the aforesaid embodiment are represented by the same numerals, so as to simplify the description. Similarly, when the user wants to use the portable electronic device 68, he/she can rotate the display module 54 of the portable electronic device 68 in the second rotating direction R2 relative to the host module 52 from the closed state in FIG. 10 to the opened state in FIG. 9. At this time, the support frame 72 supports the host module 52. In this embodiment, as shown in FIGS. 9 and 10, the portable electronic device 68 may also comprise at least one skidproof component 66 disposed outside the support frame 72 and used for enhancing the stability of the portable electronic device 68 placed on a plane. On the other hand, when the user wants to use the portable electronic device 68 as a flat computer, he/she can rotate the display module 54 shown in FIG. 11 in the first rotating direction R1 with 180 degrees relative to the support frame 70 and then close the display module 54 on the host module 52 in a reverse direction of the second rotating direction R2. Consequently, the user can use the portable electronic device 68 as a flat computer.

Figure 13:
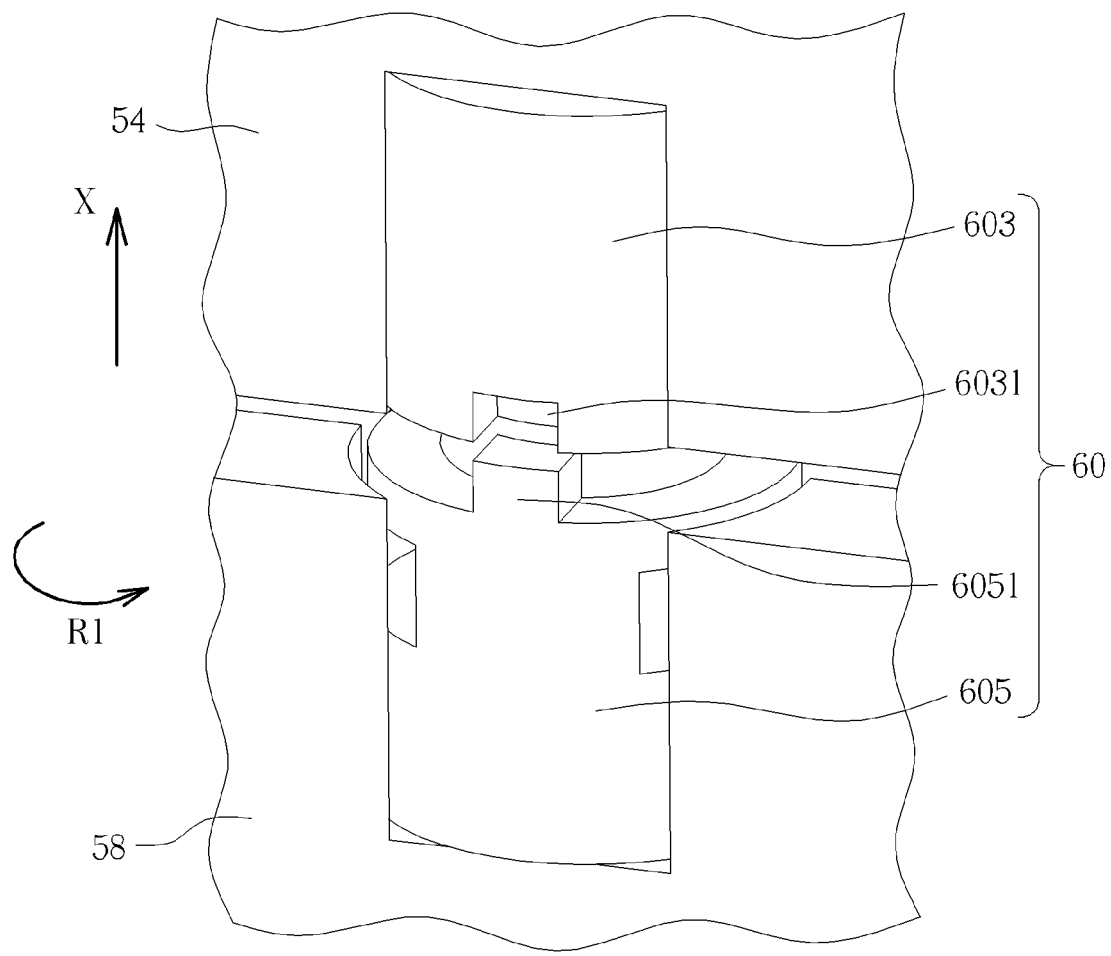
FIG. 13 is an enlarged view illustrating parts of a portable electronic device according to another embodiment of the invention.
Figure 14:
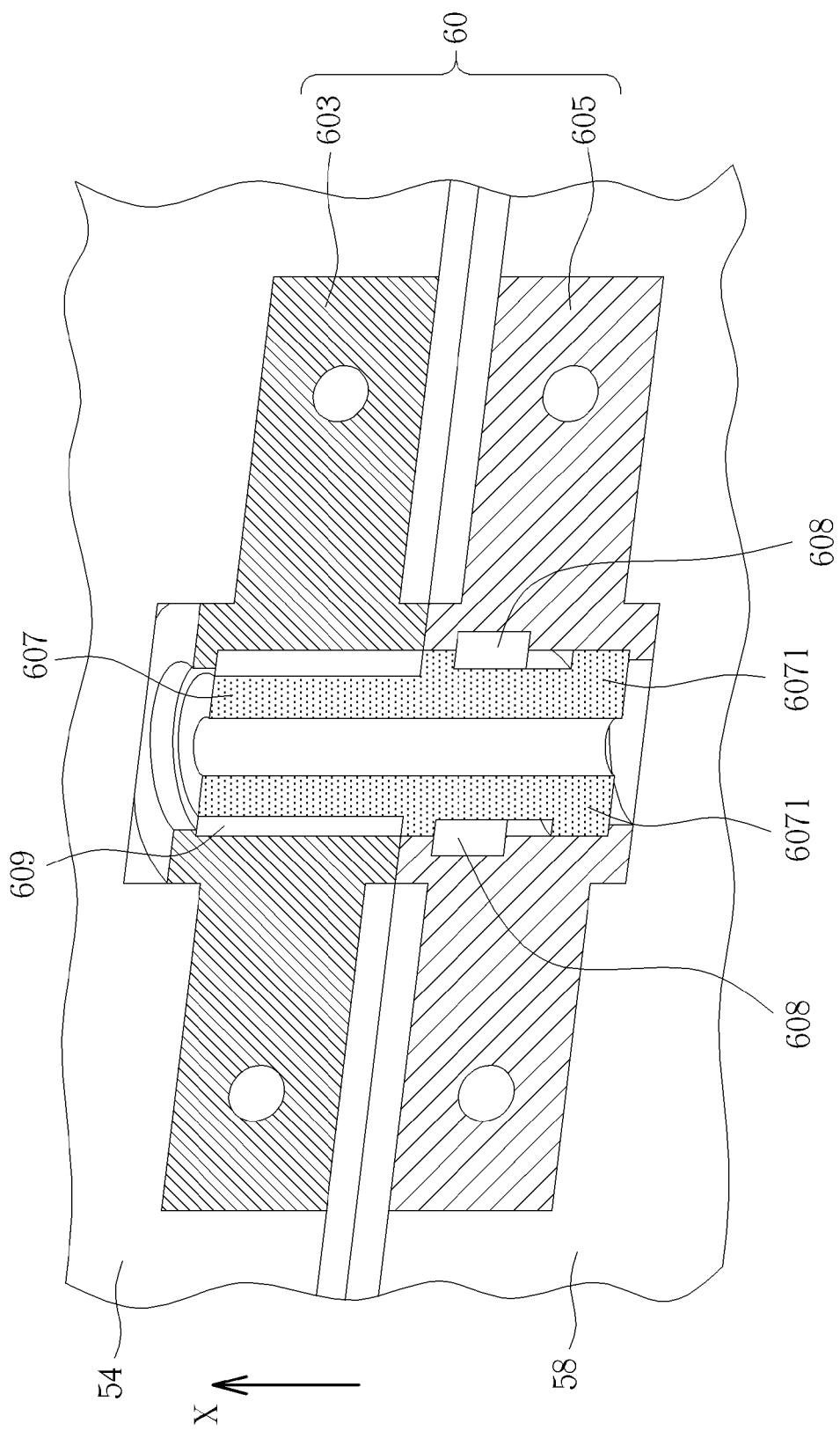
FIG. 14 is a cross-sectional view illustrating parts of a rotating component according to another embodiment of the invention.
Figure 15:
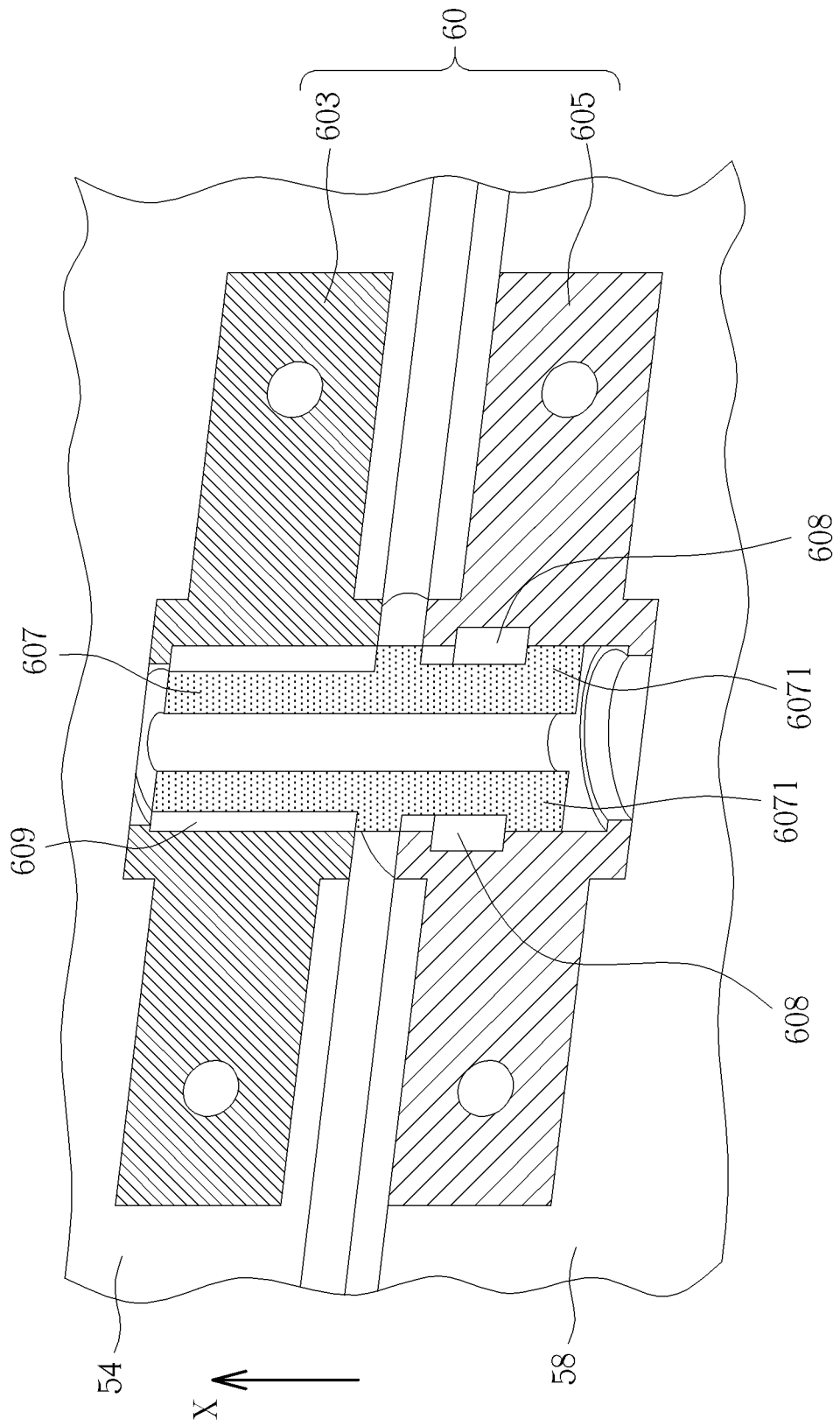
FIG. 15 is a cross-sectional view illustrating a first rotating portion moving relative to a second rotating portion according to another embodiment of the invention.

Referring to FIGS. 13 to 15, FIG. 13 is an enlarged view illustrating parts of a portable electronic device according to another embodiment of the invention, FIG. 14 is a cross-sectional view illustrating parts of a rotating component according to another embodiment of the invention, and FIG. 15 is a cross-sectional view illustrating a first rotating portion moving relative to a second rotating portion according to another embodiment of the invention. In this embodiment, the rotating component 60 further comprises a first rotating portion 603 and a second rotating portion 605. The first rotating portion 603 is installed inside the display module 54 and an engaging groove 6031 is formed on the first rotating portion 603. The second rotating portion 605 is installed inside the support frame 58 and a restraining block 6051 is formed on the second rotating portion 605 and corresponding to the engaging groove 6031. The restraining block 6051 is engaged in the engaging groove 6031 so as to restrain the first rotating portion 603 from rotating relative to the second rotating portion 605. The first rotating portion 603 is capable of rotating in the first rotating direction R1 relative to the second rotating portion 605 while the first rotating portion 603 moves in a first direction X relative to the second rotating portion 605 such that the engaging groove 6031 is disengaged from the restraining block 6051. In other words, under a general condition, when the user performs touch operation on the display module 54, the display module 54 will not rotate in the first rotating direction R1 relative to the support frame 58 since the restraining block 6051 is engaged in the engaging groove 6031, so as to prevent the display module 54 from being damaged. When the user wants to rotate the display module 54 relative to the support frame 58, he/she only has to drive the first rotating portion 603 to move in the first direction X relative to the second rotating portion 605 so as to disengage the engaging groove 6031 from the restraining block 6051.

Referring to FIGS. 14 and 15, the rotating component 60 further comprises an axle 607, at least one restraining component 608 and a sleeve 609. The axle 607 is installed inside the first rotating portion 603 and the second rotating portion 605, wherein the axle 607 is capable of moving together with the first rotating portion 603 and moving relative to the second rotating portion 605. At least one protruding block 6071 is formed on the axle 607. In this embodiment, there are two protruding blocks 6071 formed on the axle 607. Furthermore, the sleeve 609 is disposed between the first rotating portion 603 and the axle 607 in a tight-fitting manner such that the axle 607 is capable of moving together with the first rotating portion 603. The at least one restraining component 608 is installed inside the second rotating portion 605. The at least one restraining component 608 is used for abutting against the at least one protruding block 6071 while the first rotating portion 603 moves in the first direction X relative to the second rotating portion 605, so as to prevent the axle 607 from coming off the second rotating portion 605. In other words, when the user drives the first rotating portion 603 to move in the first direction X relative to the second rotating portion 605, the restraining component 608 can abut against the protruding block 6071 so as to prevent the axle 607 and the first rotating portion 603 from coming off the second rotating portion 605. In this embodiment, there are two restraining components 608 installed inside the second rotating portion 605 of the rotating component 60.

Compared with the prior art, the rotatable hinge structure of the portable electronic device of the invention comprises a support frame, a rotating component and two pivotal components. Since the frame, the rotating component and the two pivotal components are separated from each other, the portable electronic device of the invention can be used as a conventional notebook or a flat computer, the size of the hinge structure is reduced greatly, and the stability for touch operation performed on the display module relative to the host module is enhanced. Accordingly, the problems mentioned in the prior art can be improved by the invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A portable electronic device comprising:
a host module;
a display module; and
a hinge structure pivotally connected to the host module and the display module, the hinge structure comprising:
a support frame;
a rotating component, an end of the rotating component being installed inside the support frame and another end of the rotating component being installed inside the display module, so that the display module is capable of rotating in a first rotating direction relative to the support frame; and
two pivotal components disposed at opposite sides of the support frame and separated from the rotating component, an end of each pivotal component being installed inside the support frame and another end of each pivotal component being installed inside the host module, so that the display module is capable of rotating in a second rotating direction relative to the host module, wherein the second rotating direction is different from the first rotating direction.

2. The portable electronic device of claim 1, wherein the support frame is used for supporting the host module while the display module rotates to open in the second rotating direction relative to the host module.

3. The portable electronic device of claim 2, wherein the support frame comprises:
a support portion;
a first connecting portion connected to the support portion and used for connecting the rotating component; and
a second connecting portion connected to the first connecting portion and used for connecting the two pivotal components.

4. The portable electronic device of claim 3, wherein an indentation is formed on the host module and used for accommodating the second connecting portion, a length of the second connecting portion is substantially equal to a length of the indentation.

5. The portable electronic device of claim 3, wherein a length of the second connecting portion is shorter than a length of the first connecting portion, an accommodating space is formed between the second connecting portion and the first connecting portion and used for accommodating the two pivotal components.

6. The portable electronic device of claim 3, wherein the support portion is column-shaped, and a sum of a thickness of the display module close to the first connecting portion and a thickness of the host module close to the second connecting portion is substantially equal to a diameter of the support portion.

7. The portable electronic device of claim 3, wherein the rotating component is disposed at a central position of the first connecting portion and the two pivotal components are disposed at opposite sides of the second connecting portion.

8. The portable electronic device of claim 3, further comprising a battery accommodated in the support portion of the support frame.

9. The portable electronic device of claim 8, wherein the battery is a column-shaped battery and the support portion is column-shaped.

10. The portable electronic device of claim 2, further comprising at least one skidproof component disposed outside the support frame.

11. The portable electronic device of claim 1, wherein at least parts of an outer surface of the support frame are arc-shaped in radial direction relative to the support frame.

12. The portable electronic device of claim 1, wherein a hole is formed at a side of the display module, and the rotating component comprises a decorative portion disposed in the hole while the another end of the rotating component is installed inside the display module.

13. The portable electronic device of claim 12, wherein a recess is formed on the host module, corresponding to the hole of the display module, and used for accommodating the decorative portion of the rotating component while the display module is closed on the host module.

14. The portable electronic device of claim 1, wherein the support frame is an elongated frame used for supporting the host module while the display module rotates to open in the second rotating direction relative to the host module.

15. The portable electronic device of claim 14, further comprising at least one skidproof component disposed outside the support frame.

16. The portable electronic device of claim 1, wherein the display module is a touch display module.

17. The portable electronic device of claim 1, wherein the first rotating direction is substantially perpendicular to the second rotating direction.

18. The portable electronic device of claim 1, wherein the rotating component comprises:

a first rotating portion installed inside the display module, an engaging groove being formed on the first rotating portion; and a second rotating portion installed inside the support frame, a restraining block being formed on the second rotating portion and corresponding to the engaging groove, the restraining block being engaged in the engaging groove so as to restrain the first rotating portion from rotating relative to the second rotating portion, the first rotating portion being capable of rotating in the first rotating direction relative to the second rotating portion while the first rotating portion moves in a first direction relative to the second rotating portion such that the engaging groove is disengaged from the restraining block.

19. The portable electronic device of claim 18, wherein the rotating component further comprises:

an axle installed inside the first rotating portion and the second rotating portion, the axle being capable of moving together with the first rotating portion and moving relative to the second rotating portion, at least one protruding block being formed on the axle; and at least one restraining component installed inside the second rotating portion, the at least one restraining component being used for abutting against the at least one protruding block while the first rotating portion moves in the first direction relative to the second rotating portion, so as to prevent the axle from coming off the second rotating portion.

20. The portable electronic device of claim 19, wherein the rotating component further comprises a sleeve disposed between the first rotating portion and the axle in a tight-fitting manner such that the axle is capable of moving together with the first rotating portion.

* * * * *

UNITED STATES PATENT AND TRADEMARK OFFICE
CERTIFICATE OF CORRECTION

| | | |
|---|---|---|
| PATENT NO. | : 9,042,091 B2 | Page 1 of 1 |
| APPLICATION NO. | : 13/975381 | |
| DATED | : May 26, 2015 | |
| INVENTOR(S) | : Wen-Chi Hsu et al. | |

It is certified that error appears in the above-identified patent and that said Letters Patent is hereby corrected as shown below:

On the title page, item (73), correct the name of the assignee from "Winstron Corporation" to
--Wistron Corporation--.

Signed and Sealed this

Thirteenth Day of October, 2015

Michelle K. Lee
*Director of the United States Patent and Trademark Office*